US006666896B1

(12) United States Patent
Peng

(10) Patent No.: US 6,666,896 B1
(45) Date of Patent: Dec. 23, 2003

(54) PROJECTION DISPLAY HAVING A HIGH RELIABILITY ILLUMINATION SYSTEM

(75) Inventor: Guolin Peng, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 10/237,396

(22) Filed: Sep. 9, 2002

(51) Int. Cl.[7] .................. G03B 21/26; G03B 21/14; G03B 21/20; G02F 1/1335; H04N 9/31
(52) U.S. Cl. ..................... 3543/94; 353/20; 353/85; 353/121; 349/9; 348/744
(58) Field of Search ............... 353/85, 86, 94, 353/31, 20, 121, 122; 348/744; 349/9

(56) References Cited

U.S. PATENT DOCUMENTS 5,994,791 A 11/1999 Rayner .................. 307/31
6,540,363 B1 4/2003 Steffensmeier ............ 353/31
6,543,900 B2 4/2003 Noji et al. ................. 353/94

Primary Examiner—Russell Adams
Assistant Examiner—Melissa J Koval
(74) Attorney, Agent, or Firm—Nathan O. Jensen; Kyle Eppele

(57) ABSTRACT

A projection display has a display screen for displaying images formed by image engines illuminated by a high-reliability illumination source. The illumination source contains lamps for illumination of the image engines. Optical components conduct the light from the lamps to the image engines such that when a lamp fails illumination is maintained on the display screen by varying the power to the remaining lamps. A lamp power controller senses failure of a lamp and varies the power to the remaining lamps to compensate for the lamp failure.

18 Claims, 4 Drawing Sheets

PROJECTION DISPLAY HAVING A HIGH RELIABILITY ILLUMINATION SYSTEM

BACKGROUND OF THE INVENTION

This invention relates to aircraft cockpit projection displays, projection liquids crystal displays (LCD), and more specifically to illumination of LCD cockpit projections displays.

While cathode ray tube (CRT) and color active matrix liquid crystal display (AMLCD) technologies remain a viable display media for some cockpit applications, projection displays offer several unique advantages that render them highly attractive for aircraft applications.

Projection display technology provides an important advantage over other competing technologies. A single compact optical engine design may be utilized for a display image source for varied display sizes, achieving a scaleable display design. An optical engine comprises an image engine that generates the image and projection optics that project the image on a screen. A type of image engine that may be used is a reflective micro LCD device with a size of less than one inch diagonal that is manufactured on silicon. One projection optical engine combined with slightly modified folded optics may be used for displays ranging in size from 5" square to 32" diagonal. This flexibility allows leveraging a current design into new products, which results in lower development costs and faster timing to market. Projection display technology will also enable customers to benefit from continuing advances in commercial projection components without having to undergo major system changes to current products. For example, as the commercial market drives higher resolution and more efficient reflective LCDs and lamps, projection display products may incorporate these improvements by replacing individual components with minimal impact to the system. Projection displays offer performance such as luminance, contrast ratio, and chromaticity equal or superior to an AMLCD. The versatility of projection displays makes them a viable candidate technology for both military and commercial cockpit designs for new aircraft as well as cockpit redesigns for existing aircraft.

A projection LCD has several essential subsystems. Among them, the illumination subsystem is very critical. The failure of the illumination subsystem will immediately cause the projection display to stop displaying information. In order to use projection displays as aircraft cockpit displays, the illumination subsystem must be very reliable. When an aircraft is airborne under normal operating and environmental conditions, the illumination subsystem of a cockpit projection display should never fail. However, none of the current single lamp illumination systems has such a high reliability. What is needed is a projection display illumination configuration that provides illumination when a lamp fails.

SUMMARY OF THE INVENTION

A projection display with a high reliability illumination system is disclosed. Image signal sources provide image signals to be displayed on the projection display. Controllers convert the image signals from the image signal sources into signal formats for displaying and providing image drive signals. Image engines are connected to the controllers and form the display images for display. The illumination system provides light to illuminate the image engines to project the display images. The illumination system has variable power lamps to provide the light. Optical components conduct the light from the lamps to the image engines. The optical components are disposed to conduct the light to the image engines such that when a lamp fails illumination is maintained by varying the power to the remaining lamps. Projection optics channel the display image to a screen for displaying the image.

The illumination system further comprises a first channel with a first lamp providing light to a linear polarizer for polarizing the light from the first lamp into s-polarized light. A second lamp provides light to a first polarizing beam splitter for receiving the light from the second lamp and splitting the light from the second lamp into s-polarized light and p-polarized light. The first polarizing beam splitter receives the s-polarized light from the linear polarizer and combines the s-polarized light from the linear polarizer with the split p-polarized light. A second polarizing beam splitter receives the combined s- and p-polarized light from the first polarizing beam splitter and splits the combined s- and p-polarized light into s-polarized light and p-polarized light. A first mirror reflects the s-polarized light from the second polarizing beam splitter. A first half-wave retarder receives the s-polarized light reflected from the first mirror and shifts the s-polarized light to p-polarized light. A first converging lens combines the p-polarized light from the second polarizing beam splitter and the p-polarized light from the first half-wave retarder. A first light pipe channels the combined light from the converging lens to a first image engine.

The illumination system may further comprise a second channel with a third lamp for providing light. A third polarizing beam splitter receives the light from the third lamp and splits the light from the third lamp into s-polarized light and p-polarized light and receives the s-polarized light from the first polarizing beam splitter and combines the s-polarized light from the first polarizing beam splitter with the split p-polarized light. A fourth polarizing beam splitter receives the combined s- and p-polarized light from the third polarizing beam splitter and splits the combined s- and p-polarized light into s-polarized light and p-polarized light. A second mirror reflects the s-polarized light from the fourth polarizing beam splitter. A second half-wave retarder receives the s-polarized light reflected from the mirror and shifts it to p-polarized light. A second converging lens combines the p-polarized light from the fourth polarizing beam splitter and the p-polarized light from the second half-wave retarder. A second light pipe channels the combined light from the converging lens to a second image engine.

A lamp controller powers the lamps and a lamp sensor detects a failure of one of the lamps and causes the lamp controller to adjust power to the operating lamps to maintain illumination of the screen.

It is an object of the present invention to provide an illumination system that provides light for a projection display when a lamp fails.

It is an object of the present invention to provide a multi-channel LCD projection display with an illumination system with high reliability.

It is an advantage of the present invention to maintain illumination of a projection display automatically when a lamp fails.

It is an advantage of the present invention to easily expand to more channels as required.

It is a feature of the present invention to use commercially available components.

BRIEF DESCRIPTION OF THE DRAWINGS

The invention may be more fully understood by reading the following, on of the preferred embodiments of the invention in conjunction with the drawings wherein.

DETAILED DESCRIPTION

Figure 1:
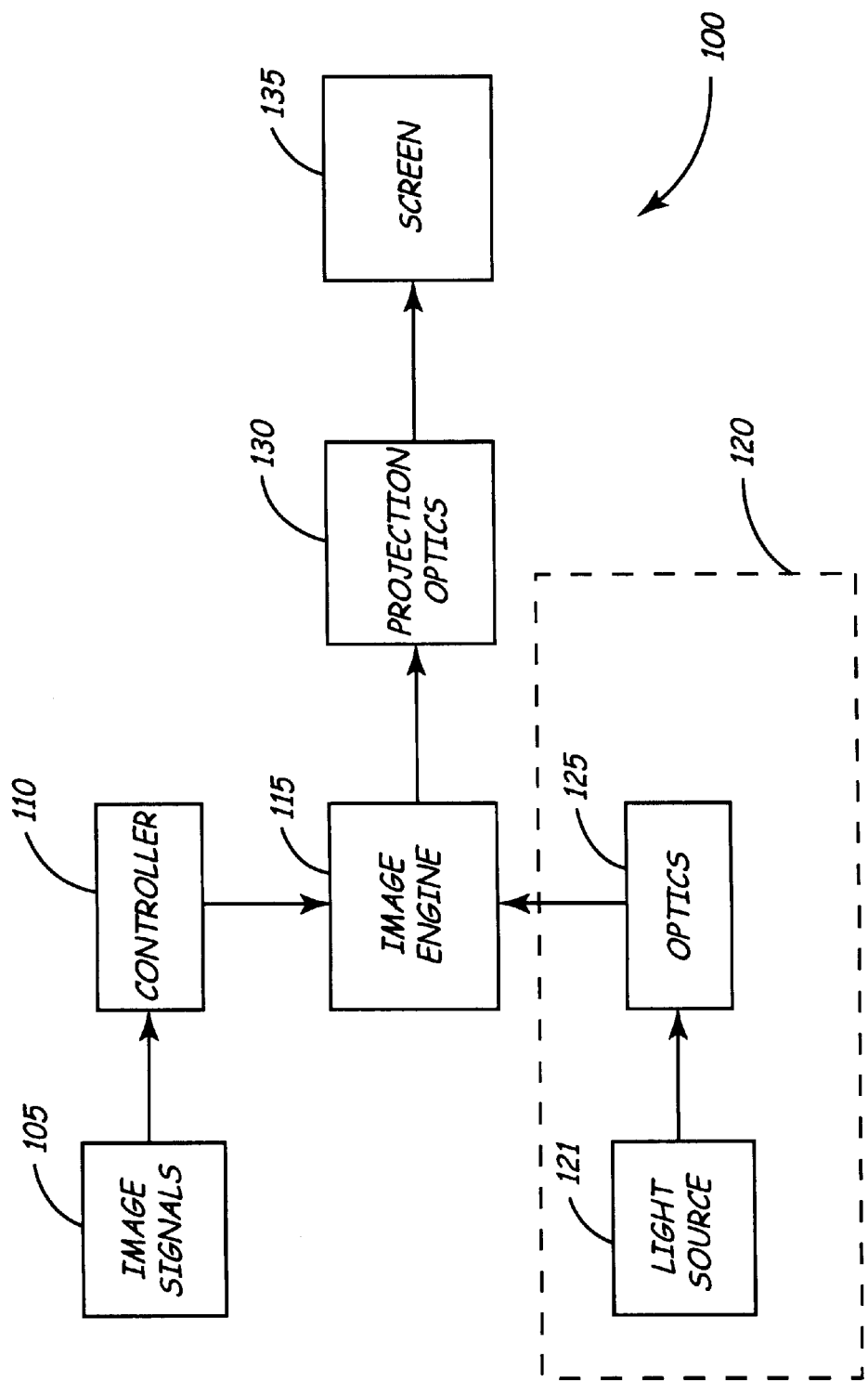
FIG. 1 is a block diagram of a single-channel liquid crystal projection display.

A block diagram of a basic single-channel projection display 100 is shown in FIG. 1. There are two major types of projection display 100. One is a front projection display where the projector is behind a viewer and both the viewer and projector face a screen 135 as in a movie theater. The other type of projection display is a rear projection display where the projector is on one side of the screen 135 and the viewer is on the other side looking at the screen as in a projection television set. The rear projection display is the type most suitable for aircraft cockpit display applications.

The basic single-channel projection display 100 comprises several subsystems as shown FIG. 1. An image signal source 105 provides image signals to be displayed on the screen 135. The image signals 105 may come from a wide variety of sources and may be analog or digital signals. In an aircraft cockpit display, the image signals 105 may come from such data sources as flight control systems, altimeters, engine indicating systems, or any other avionics data source for display of data to a pilot in an aircraft.

The image signals 105 are passed to a controller 110 that converts the image signals 105 to a format compatible with an image engine 115 and to drive the image engine 115 to generate an image for projection on the screen 135. The image engine 115 may be one of a wide variety of image engines known in the art. Two major categories of image engine 115 include transmissive panels that either block light or transmit light to create an image and reflective panels that reflect light from the panel surface. The image engine 115 itself may be a very small LCD panel such as less than an inch diagonally. Among these is a reflective micro LCD device that is manufactured on silicon.

An illumination system 120 comprising a light source 121 and optics 125 in FIG. 1 supply light for the projection display 100. The light source 121 may comprise a reflector and a lamp of some type. Types of lamps include metal halide lamps and ultra high pressure arc lamps. The optics 125 in the illumination system 120 are used to channel the light from the light source 121 to the image engine 115.

Projection optics 130 are used in front of the image engine 115 to project the image on the screen 135. The type of projection optics 130 depends on the type of image engine 115 and the type of projection display system, front or rear.

Figure 2:
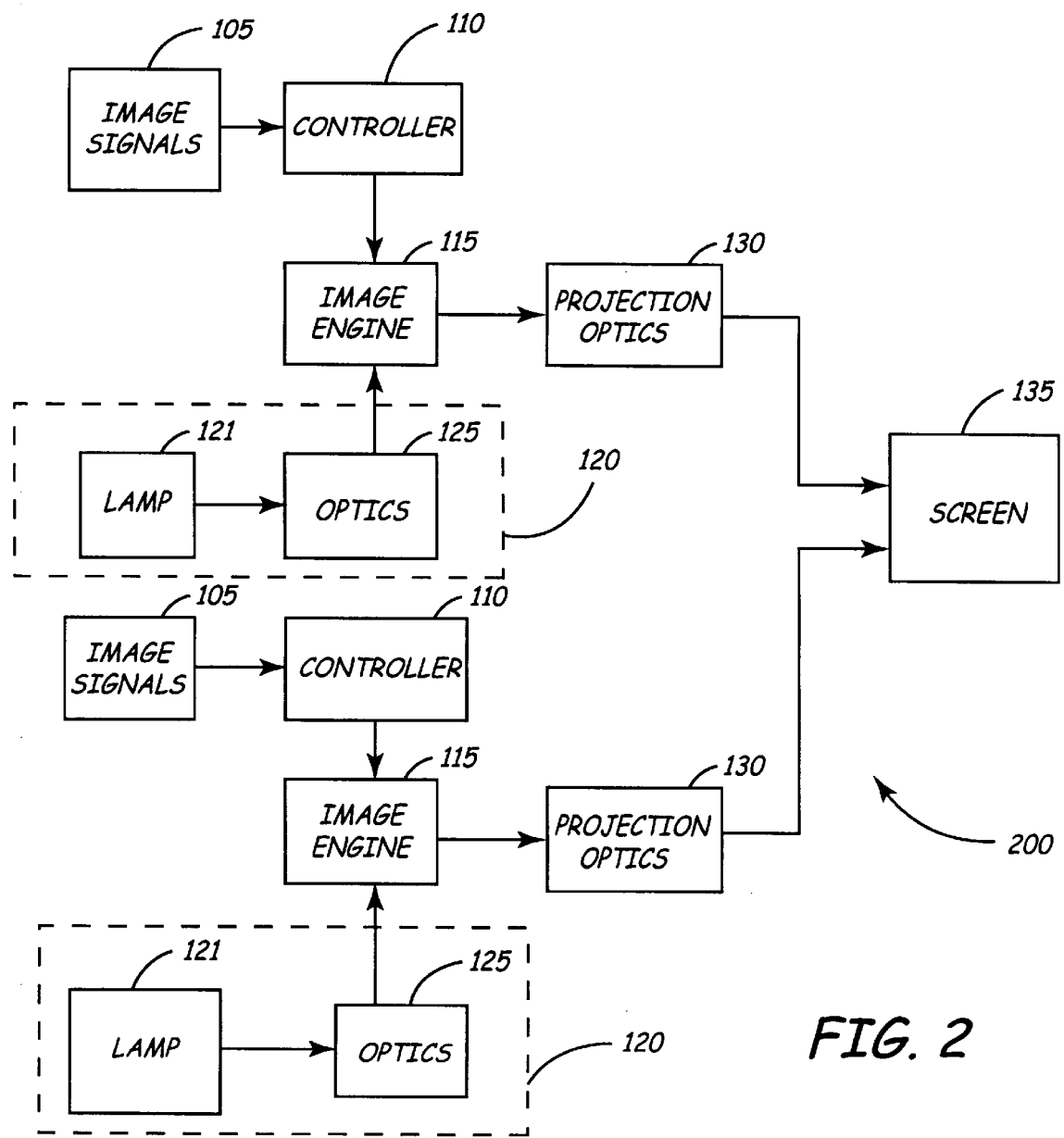
FIG. 2 is a block of a multi-channel liquid crystal projection display.

A multi-channel display 200 shown in FIG. 2 may be assembled by duplicating various portions of the projection display 100 of FIG. 1. The multi-channel system 200 of FIG. 2 shows two channels while more than two may be implemented. The purpose of multi-channel display 200 is to accommodate additional image signal sources 105 on board an aircraft to be displayed on a single screen 135. Avionics systems typically have many image signal sources 105 that require displaying on a common screen 135. With the additional image signal sources 105, additional controllers 110 and image engines 115 are also required. Each additional image engine 115 also has an additional illumination system 120. Additional projection optics 130 after each image engine 115 are used to combine the images for display on the common screen 135.

The illumination system 120 comprises the light source or lamp 121 and the optics 125. Generally, optical components such as lenses, mirrors, retarders, and filters never fail. The main source of failure in the illumination system 120 is the lamp 121.

Figure 3:
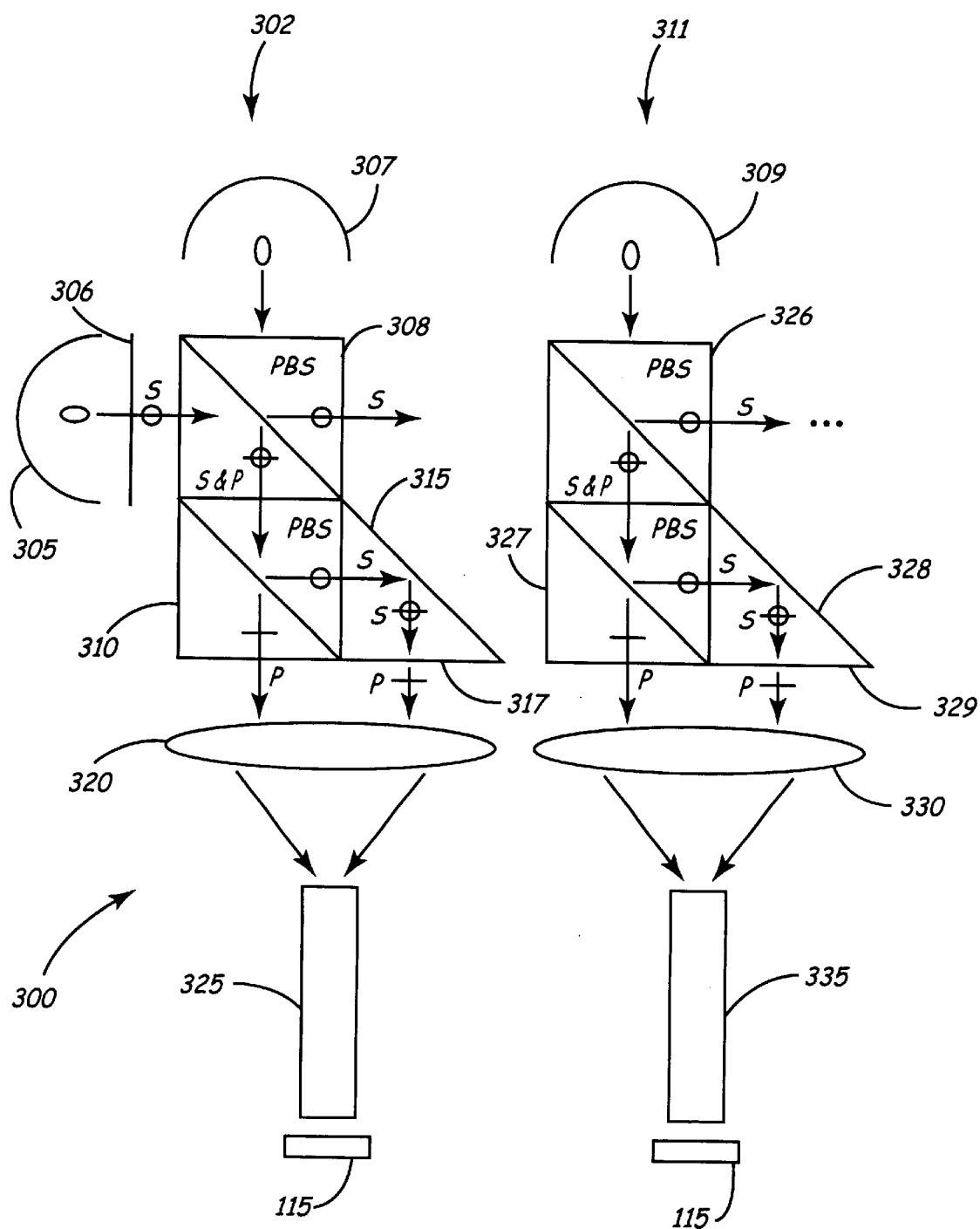
FIG. 3 is a diagram of an illumination system of the present invention for the multi-channel projection display of FIG. 2.

An illumination system 300 of the present invention is shown in FIG. 3. Shown in FIG. 3 is a two-channel illumination system 300 comprising a first channel 302 and a second channel 311 that may be incorporated in the illumination systems 120 for the two-channel cockpit projection display 200 of FIG. 2. The first channel 302 may be incorporated in the illumination system 120 in the single-channel cockpit projection display 100 of FIG. 1. Additional channels may be added as will be discussed below. The illumination system 300 of the present invention addresses the problem of a lamp failure in a projection display through the use of multiple commercially available lamps and optical components to compensate for a lamp failure.

As shown in FIG. 3, three lamp-reflector combinations are used comprising lamp 1 305, lamp 2 307, and lamp 3 309 in the two-channel implementation. The first channel 302 has two lamps lamp 1 305 and lamp 2 307. Light from lamp 1 305 is passed through a linear polarizer 306 where it is shifted to s-polarized light. The s-polarized light from the linear polarizer 306 is passed to a first polarized beam splitter (PBS) 308. Polarizing beam splitters are known in the art and are commercially available. A polarizing beam splitter is a cube formed from two optical quality glass right angle prisms cemented together at the hypotenuse that splits incoming unpolarized light in to two orthogonal polarized light beams, s-polarized and p-polarized. The light from lamp 2 307 is split in PBS 308 into s- and p-polarized light with the s-polarized light reflected to the right of the first channel 302 in FIG. 3. The s-polarized light from the linear polarizer 306 and lamp 1 305 is reflected down from the PBS 308 beam splitting surface and combined with the p-polarized light from lamp 2 307 split by PBS 308. This combined light from PBS 308 enters a second PBS 310. PBS 310 splits the combined light from PBS 308 into s-polarized light again reflected to the right and p-polarized light that is passed down through PBS 310. The s-polarized light coming from PBS 310 on the right in FIG. 3 is reflected by a first mirror 315 down to a first half-wave retarder plate 317 where it is shifted to p-polarized light. The p-polarized light from PBS 310 and from half-wave retarder plate 317 are combined in a first converging lens 320. The light from the converging lens 320 is passed to a first light pipe 325 where it is conducted to the image engine 115 to illuminate the LCD display.

The s-polarized light that is reflected to the right of PBS 308 from the first channel 302 is passed to the second channel 311. The second channel 311 is very similar to the first channel 302 except that the second channel 311 has only one lamp, lamp 3 309. The s-polarized light from the first channel 302 takes the place of light from lamp 1 305 and linear polarizer 306. The remainder of the second channel 311 operates in the same fashion as the first channel 302. The s-polarized light from the first channel 302 is passed to a third PBS 326. The light from lamp 3 309 is split in PBS 326 into s- and p-polarized light with the s-polarized light reflected to the right of the second channel 311. The s-polarized light from the first channel 302 is reflected down from the PBS 326 beam splitting surface and combined with the p-polarized light from lamp 3 309 split by PBS 326. This combined light from PBS 326 enters a fourth PBS 327. PBS 327 splits the combined light from PBS 326 into s-polarized light again reflected to the right and p-polarized light that is passed down through PBS 327. The s-polarized light coming from PBS 327 to the right is reflected by a second mirror 328 down to a second half-wave retarder plate 329 where it is shifted to p-polarized light. The p-polarized light from PBS 327 and from half-wave retarder plate 329 are combined in a second converging lens 330. The light from the converging lens 330 is passed to a second light pipe 335 where it is conducted to another image engine 115 to illuminate the LCD display.

Figure 4:
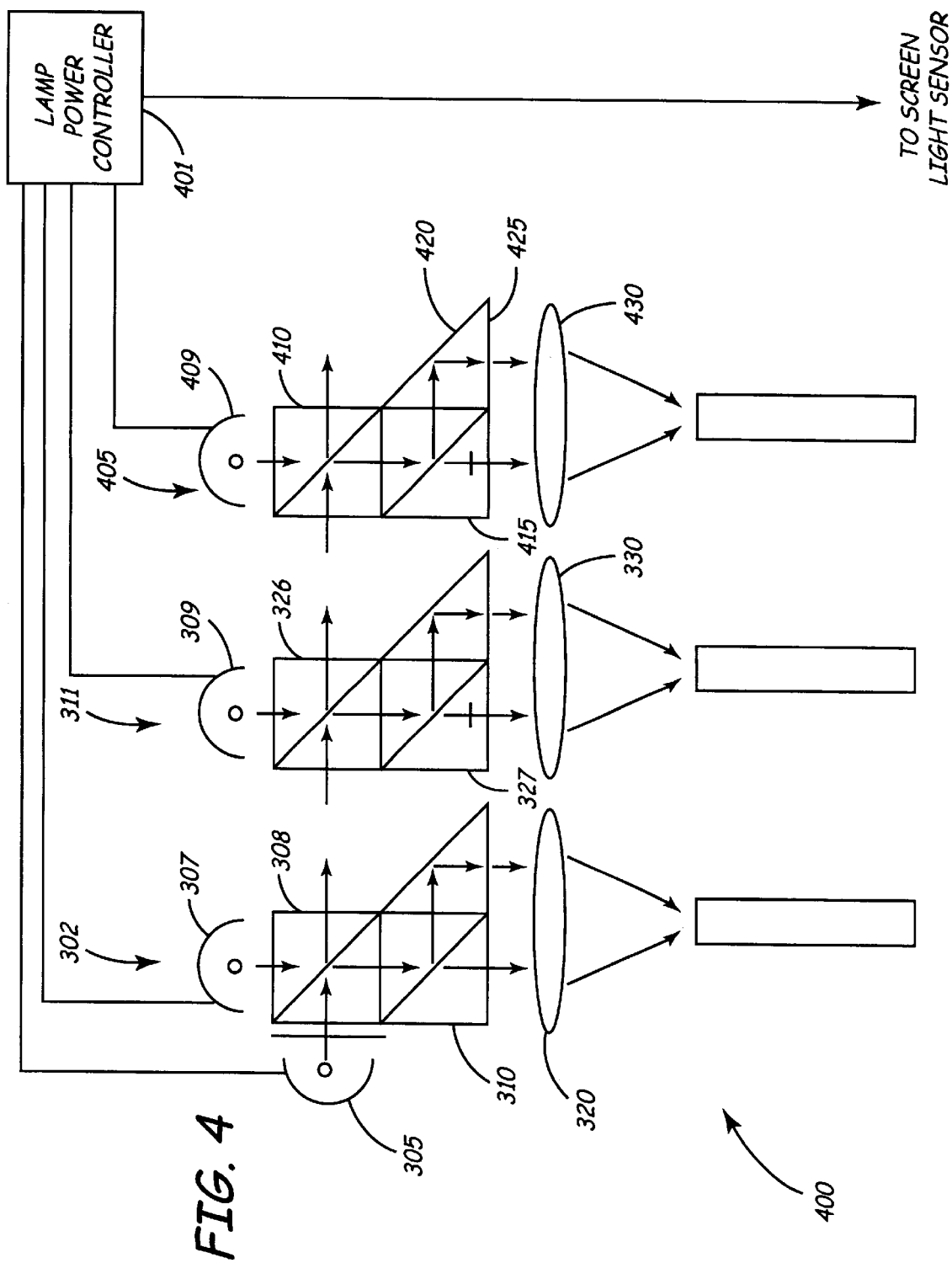
FIG. 4 is a diagram of the illumination system of the present invention implemented with three channels.

Additional channels may be added to the illumination system 300 of FIG. 3 by adding channels similar to the second channel 311. The next channel added to the system of FIG. 3 would use the s-polarized light coming from PBS 326 in the same fashion as the second channel 311. A diagram of a three-channel illumination system 400 is shown in FIG. 4. In the third channel 405, a lamp 4 409 provides the light to a fifth polarizing beam splitter 410 that splits the beam and passes light to a sixth PBS 415 as in the first channel 302 and the second channel 311. The light is reflected by a third mirror 420, shifted in polarity by third retarder 425, and combined in third converging lens 430 as before.

In FIG. 4, a lamp power controller 401 provides and controls power to the lamps. The lamps in the three-channel illumination system 400 of FIG. 4 are initially operating at some power level less than full power. If any one of the four lamps in FIG. 4 fails, the failure is sensed and the power to the three remaining operable lamps is adjusted to compensate for the failure. A light sensor (not shown) located near the screen 135 may be used to sense light at the screen 135 and provide a fail signal to the lamp power controller 401. To sense a lamp failure the lamp light output or current draw of the lamps may be sensed with techniques known in the art. Light sensors (not shown) may be located near each lamp to sense a lamp failure and provide a fail signal to the lamp power controller 401. The lamp power controller 401 may include current sense circuitry to sense a lamp failure.

As an example, in FIG. 4 assume that lamp 1 305 fails. The light entering PBS 308 from lamp 1 305 is lost as and the amount of s- and p-polarized light leaving PBS 308 down to PBS 310 is reduced. To compensate for the loss of lamp 1 305 as detected by a lamp sensor (not shown), the power to lamp 2 is increased by the lamp power controller 401 to maintain the light entering PBS 310 and ultimately converging lens 320 and image engine 115. The increase in s-polarized light from lamp 2 307 reflected to the second channel 311 from PBS 308 also increases. To compensate for the increased light entering the second channel 311 and PBS 326 from PBS 308 in the first channel 302, the lamp power controller 401 reduces power to lamp 3 309 to maintain the light entering PBS 327, converging lens 330 and image engine 115. This decrease in power from lamp 3 309 results in a decrease in power to the third channel 405. This decrease in power from the second channel 311 must be compensated for by an increase in power to lamp 4 409. As can be seen from this example, failure of a single lamp does not result in a catastrophic failure of the illumination system 400 and the projection display. The display screen 135 remains illuminated with a lamp failure with the present invention.

The table below shows operational states of the four lamps for the three-channel LCD projection display shown in FIG. 4. The various possible conditions are shown down the left side of the table as case 1 through case 5. Each lamp is listed across the top of the table. The lamp power controller 401 adjusts power to the lamps in accordance to this table when sensing a failure. A x in the table indicates lamp failure, a + indicates increasing lamp power, a − indicates decreasing lamp power, and a blank indicates no change. Case 1 with a blank for each lamp is the normal case with no failures. Case 2 shows a x for lamp 1 failure and is the case described above in detail. Lamp 1 fails, lamp 2 increases in power, lamp 3 decreases in power, and lamp 4 increases in power in case 2. Cases 3, 4, and 5 show failures of lamps 2, 3, and 4 respectively and the operating conditions of the other lamps.

|        | Lamp 1 | Lamp 2 | Lamp 3 | Lamp 4 |
|--------|--------|--------|--------|--------|
| Case 1 |        |        |        |        |
| Case 2 | x      | +      | −      | +      |
| Case 3 | +      | x      | +      | −      |
| Case 4 | −      | +      | x      | +      |
| Case 5 | +      | −      | +      | x      |

While the present invention is generally described in terms of a display for displaying avionics data in an aircraft cockpit application, the present invention is not limited to such applications. The present invention may be used in a single-channel or any multi-channel projection display application.

It is believed that the illumination configuration for multi-channel cockpit LCD projections displays of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A projection display comprising:
   at least one image signal source for providing image signals to be displayed on the projection display;
   at least one controller for converting the image signals from the image signal source into signal formats for displaying and providing image drive signals;
   at least one image connected to the controller for forming display images from the image drive signals;
   a first lamp providing light;
   a linear polarizer for polarizing the light from the first lamp into s-polarized light;
   a second lamp providing light;
   a first polarizing beam splitter for receiving the light from the second lamp and splitting the light from the second lamp into s-polarized light and p-polarized light and for receiving the s-polarized light from the linear polarizer and combining the s-polarized light from the linear polarizer with the split p-polarized light;
   a second polarizing beam splitter for receiving the combined s- and p-polarized light from the first polarizing beam splitter and splitting the combined s- and p-polarized light into s-polarized light and p-polarized light;
   a first mirror for reflecting the s-polarized light from the second polarizing beam splitter;
   a first half-wave retarder for receiving the s-polarized light reflected from the first mirror and shifting the s-polarized light to p-polarized light;
   a first converging lens for combining the p-polarized light from the second polarizing beam splitter and the p-polarized light from the first half-wave retarder;

a first light pipe for channeling the combined light from the converging lens to a first image engine to form the display image;

projection optics for channeling the display image from the first image engine;

a screen for displaying the image; and further comprising a lamp power controller for detecting a failure of a lamp and adjusting power to an operating lamp to maintain illumination of the screen.

2. The projection display of claim 1 further comprising:

a third lamp providing light;

a third polarizing beam splitter for receiving the light from the third lamp and splitting the light from the third lamp into s-polarized light and p-polarized light and for receiving the s-polarized light from the first polarizing beam splitter and combining the s-polarized light from the first polarizing beam splitter with the split p-polarized light;

a fourth polarizing beam splitter for receiving the combined s- and p-polarized light from the third polarizing beam splitter and splitting the combined s- and p-polarized light into s-polarized light and p-polarized light;

a second mirror for reflecting the s-polarized light from the fourth polarizing beam splitter;

a second half-wave retarder for receiving the s-polarized light reflected from the mirror and shifting it to p-polarized light;

a second converging lens for combining the p-polarized light from the fourth polarizing beam splitter and the p-polarized light from the second half-wave retarder; and a second light pipe for channeling the combined light from the converging lens to a second image engine.

3. The projection display of claim 1 wherein the lamp power controller detects a failure of the first lamp and increases power to the second lamp.

4. The projection display of claim 1 wherein the lamp power controller detects a failure of the second lamp and increase power to the first lamp.

5. The projection display of claim 2 wherein the lamp power controller detects a failure of the first lamp, increases power to the second lamp and decreases power to the third lamp.

6. The projection display of claim 2 wherein the lamp power controller detects a failure of the second lamp and increases power to the first lamp and the third lamp.

7. The projection display of claim 2 wherein the lamp power controller detects a failure of the third lamp, decreases power to the first lamp and increases power to the second lamp.

8. A projection display having a display screen for displaying images formed by at least one image engine illuminated by a high-reliability illumination system said illumination system comprising:

a first lamp providing light;

a polarizer for polarizing the light from the first lamp;

a second lamp providing light;

a first polarizing beam splitter for receiving the light from the second lamp and splitting the light from the second lamp into two orthogonal polarized beams and for receiving the polarized light from the first lamp and combining the polarized light from the first lamp with a split polarized beam from the second lamp;

a second polarizing beam splitter for receiving the combined polarized light from the first polarizing beam splitter and splitting the combined polarized light into two additional orthogonal polarized beams;

a first mirror for reflecting a split polarized beam from the second polarizing beam splitter;

a first half-wave retarder for shifting the polarization of the split polarized beam reflected from the first mirror; and a first converging lens for combining the split polarized beam from the second polarizing beam splitter and the shifted polarized light from the first half-wave retarder for illuminating the at least one image engine;

a lamp power controller for sensing failure of a lamp and varying lamp power to maintain illumination on the display screen.

9. The projection display of claim 8 wherein the illumination system comprises a second channel said second channel comprising:

a third lamp providing light;

a third polarizing beam splitter for receiving the light from the third lamp and splitting the light from the third lamp into two orthogonal polarized beams and for receiving the polarized light from the first polarizing beam splitter and combining the polarized light from the first polarizing beam splitter with a split polarized beam from the third lamp;

a fourth polarizing beam splitter for receiving the combined polarized light from the third polarizing beam splitter and splitting the combined polarized light into two additional orthogonal polarized beams;

a second mirror for reflecting a split polarized beam from the fourth polarizing beam splitter;

a second half-wave retarder for shifting the polarization of the split polarized beam reflected from the mirror; and a second converging lens for combining the split polarized beam from the second polarizing beam splitter and the shifted polarized light from the half-wave retarder for illuminating a second image engine.

10. The projection display of claim 9 wherein the illumination system comprises a third channel said third channel comprising:

a fourth lamp providing light;

a fifth polarizing beam splitter for receiving the light from the fourth lamp and splitting the light from the fourth lamp into two orthogonal polarized beams and for receiving the polarized light from the third polarizing beam splitter and combining the polarized light from the third polarizing beam splitter with a split polarized beam from the fourth lamp;

a sixth polarizing beam splitter for receiving the combined polarized light from the fifth polarizing beam splitter and splitting the combined polarized light into two additional orthogonal polarized beams;

a third mirror for reflecting a split polarized beam from the sixth polarizing beam splitter;

a third half-wave retarder for shifting the polarization of the split polarized beam reflected from the third mirror; and a third converging lens for combining the split polarized beam from the fourth polarizing beam splitter and the shifted polarized light from the third half-wave retarder for illuminating a third image engine.

11. The projection display of claim 10 wherein the lamp power controller adjusts lamp power to compensate for a lamp failure as set forth in the table below:

|         | Lamp 1 | Lamp 2 | Lamp 3 | Lamp 4 |
|---------|--------|--------|--------|--------|
| Case 1  |        |        |        |        |
| Case 2  | x      | +      | −      | +      |
| Case 3  | +      | x      | +      | −      |
| Case 4  | −      | +      | x      | +      |
| Case 5  | +      | −      | +      | x      | where a blank indicates no change, x indicates a lamp failure, + indicates increasing lamp power, and − indicates decreasing lamp power.

12. A method of illuminating a projection display having a display screen for displaying images formed by at least one image engine illuminated by a high-reliability illumination source comprising the steps of:
    providing light from a first lamp;
    polarizing the light from the first lamp with a polarizer;
    providing light from a second lamp;
    splitting the light from the second lamp into two orthogonal polarized beams in a first polarizing beam splitter;
    combining the polarized light from the first lamp with the split polarized beam from the second lamp in the first polarizing beam splitter;
    splitting the combined polarized light into two additional orthogonal polarized beams in a second polarizing beam splitter;
    reflecting a split polarized beam from the second polarizing beam splitter with a first mirror;
    shifting the polarization of the split polarized beam reflected from the mirror with a first half-wave retarder;
    combining the split polarized beam from the second polarizing beam splitter and the shifted polarized light from the first half-wave retarder with a first converging lens; and
    illuminating the at least one image engine with the combined light from the first converging lens.

13. The method of claim 12 of illuminating a projection display with a high-reliability illumination source further comprising the steps of:
    providing light from a third lamp;
    splitting the light from the third lamp into two orthogonal polarized beams in a third polarizing beam splitter;
    combining the polarized light from the first polarizing beam splitter with the split polarized beam from the third lamp in the third polarizing beam splitter;
    splitting the combined polarized light into two additional orthogonal polarized beams in a fourth polarizing beam splitter;
    reflecting a split polarized beam from the fourth polarizing beam splitter with a second mirror;
    shifting the polarization of the split polarized beam reflected from the second mirror with a second half-wave retarder;
    combining the split polarized beam from the fourth polarizing beam splitter and the shifted polarized light from the second half-wave retarder with a second converging lens; and
    illuminating a second image engine with the combined light from the second converging lens.

14. The method of claim 13 of illuminating a projection display with a high-reliability illumination source further comprising the steps of:
    providing light from a fourth lamp;
    splitting the light from the fourth lamp into two orthogonal polarized beams in a fifth polarizing beam splitter;
    combining the polarized light from the third polarizing beam splitter with the split polarized beam from the fourth lamp in the fifth polarizing beam splitter;
    splitting the combined polarized light into two additional orthogonal polarized beams in a sixth polarizing beam splitter;
    reflecting a split polarized beam from the sixth polarizing beam splitter with a third mirror;
    shifting the polarization of the split polarized beam reflected from the third mirror with a third half-wave retarder; and
    combining the split polarized beam from the sixth polarizing beam splitter and the shifted polarized light from the third half-wave retarder with a third converging lens; and
    illuminating a third image engine with the combined light from the third converging lens.

15. The method of claim 14 of illuminating a projection display with a high-reliability illumination source further comprising the steps of:
    sensing a failure of the first lamp with a lamp power controller;
    increasing power to the second lamp with the lamp power controller;
    decreasing the power to the third lamp with the lamp power controller; and
    increasing the power to the fourth lamp with the lamp power controller to maintain illumination to the display.

16. The method of claim 14 of illuminating a projection display with a high-reliability illumination source further comprising the steps of:
    sensing a failure of the second lamp with a lamp power controller;
    increasing power to the first lamp with the lamp power controller;
    increasing the power to the third lamp with the lamp power controller; and
    decreasing the power to the fourth lamp with the lamp power controller to maintain illumination to the display.

17. The method of claim 14 of illuminating a projection display with a high-reliability illumination source further comprising the steps of:
    sensing a failure of the third lamp with a lamp power controller;
    decreasing power to the first lamp with the lamp power controller;
    increasing the power to the second lamp with the lamp power controller; and
    increasing the power to the fourth lamp with the lamp power controller to maintain illumination to the display.

18. The method of claim 14 of illuminating a projection display with a high-reliability illumination source further comprising the steps of:
    sensing a failure of the fourth lamp with a lamp power controller;
    increasing power to the first lamp with the lamp power controller;
    decreasing the power to the second lamp with the lamp power controller; and
    increasing the power to the third lamp with the lamp power controller to maintain illumination to the display.

* * * * *